B. BOULOGNE.
BUFFER FOR AUTOMATIC WEIGHING MACHINES.
APPLICATION FILED AUG. 17, 1921.

1,437,128.

Patented Nov. 28, 1922.

Inventor
B. Boulogne,
By Marks & Clerk
Attys.

B. BOULOGNE.
BUFFER FOR AUTOMATIC WEIGHING MACHINES.
APPLICATION FILED AUG. 17, 1921.

1,437,128.

Patented Nov. 28, 1922.

Inventor
B. Boulogne,
By Marks & Clerk
Attys.

B. BOULOGNE.
BUFFER FOR AUTOMATIC WEIGHING MACHINES.
APPLICATION FILED AUG. 17, 1921.

1,437,128.

Patented Nov. 28, 1922.

Inventor
B. Boulogne
By Marks & Clerk
Attys

Patented Nov. 28, 1922.

1,437,128

UNITED STATES PATENT OFFICE.

BALTUS BOULOGNE, OF SOERABAIA, JAVA, DUTCH EAST INDIES.

BUFFER FOR AUTOMATIC WEIGHING MACHINES.

Application filed August 17, 1921. Serial No. 493,058.

*To all whom it may concern:*

Be it known that I, BALTUS BOULOGNE, subject of the Queen of the Netherlands, residing at Soerabaia, Java, Dutch East Indies, have invented certain new and useful Improvements in Buffers for Automatic Weighing Machines (for which I have applied for a patent in the Netherlands Jan. 20th and 22nd, 1920), of which the following is a specification.

The invention relates to a liquid filled buffer of the cataract style for the purpose of controlling the speed of movement of the weighing beam of automatic weighing machines.

The object of the invention is to control the speed of the weighing beam for both directions in such a manner that this beam works practically without any jarring and without in the least interfering with the working of said weighing beam either one way or the other.

As the weighing beam can start its movement unimpeded, each time the result is that the cutting off of the supply to the weighing tank as well as the finish of the running out of the contents from the weighing tank is accomplished quickly, a factor of great importance for accurate weighing.

A further object of the invention is to have a buffer, controlling the speed of the weighing beam in such a manner that the movements of other members of the apparatus such as the lifting of valves, etc., proceed in a quiet manner and that in case e. g. the weighing tank is rotatably mounted upon trunnions said weighing tank will turn gradually.

In the device according to the invention this desideratum has been realized by giving the inside of the cylinder wall such a shape that in the different positions of the piston from the centre to its extreme positions of its travel, the passage for the liquid along the piston, is diminished, said cylinder being also provided with ducts and return valves in such a manner that during the first part of the motion of the piston, in both directions, the spaces at both sides of the piston will be in communication with each other. Said ducts may be arranged either in the cylinder or in the piston.

The control of the run of liquid alongside the piston in its successive positions may be obtained by giving the cylinder truncated shape towards the ends or by providing the inside wall with one or more straight or curved grooves, the section of which to be diminished from about the centre towards the ends of the cylinder.

The passage of the above-mentioned return valves may be controlled by a limited lift or by some other controlling means. Furthermore the invention relates to a device preventing the access of air to the cylinder.

The invention also relates to a device for the release from the buffer of the weighing beam at the moments of actual balancing, a factor of great importance when having to do with weighing machines for tare-weighing.

To this purpose the buffer piston is connected to a lever the centre of gravity of which shifts over the fulcrum if this piston moves from one extreme position to the other, and in such a manner that this toggle lever, after having reached its extreme position will move the buffer piston a little bit further and by so doing will bring the buffer and the weighing beam out of engagement, for which purpose the contact-surfaces of said member have some play.

In the accompanying drawing the invention is further explained.

Figure 1:
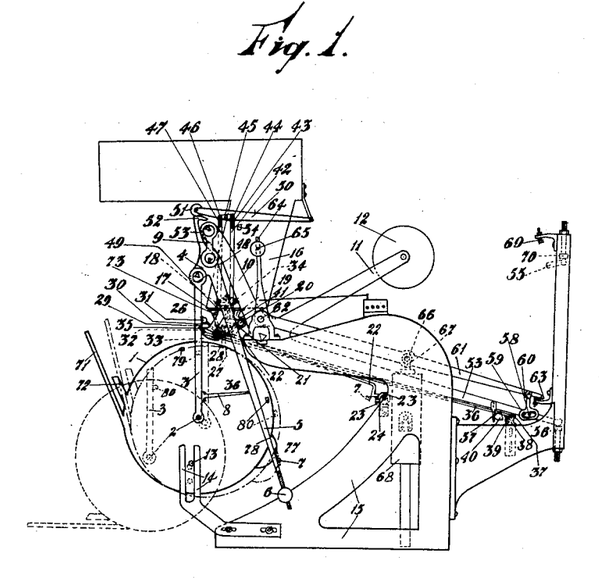
Figs. 1, 2, 3 are a side view of a weighing-machine with a weighing tank in cross-section, the members are drawn in the position occupied at the starting of the charging, whilst
Figure 2:
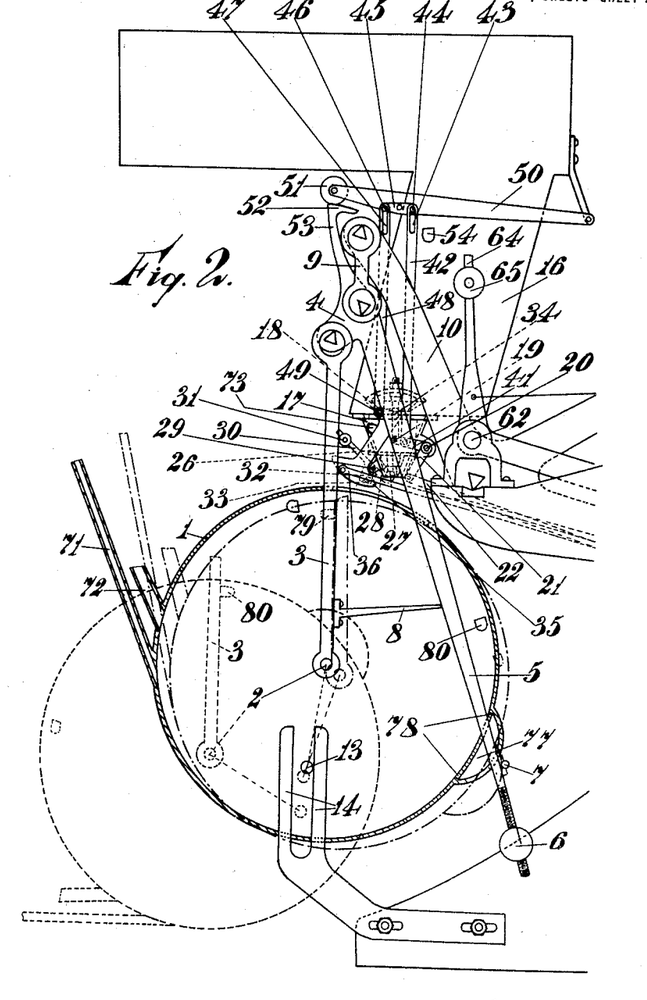
Figure 3:
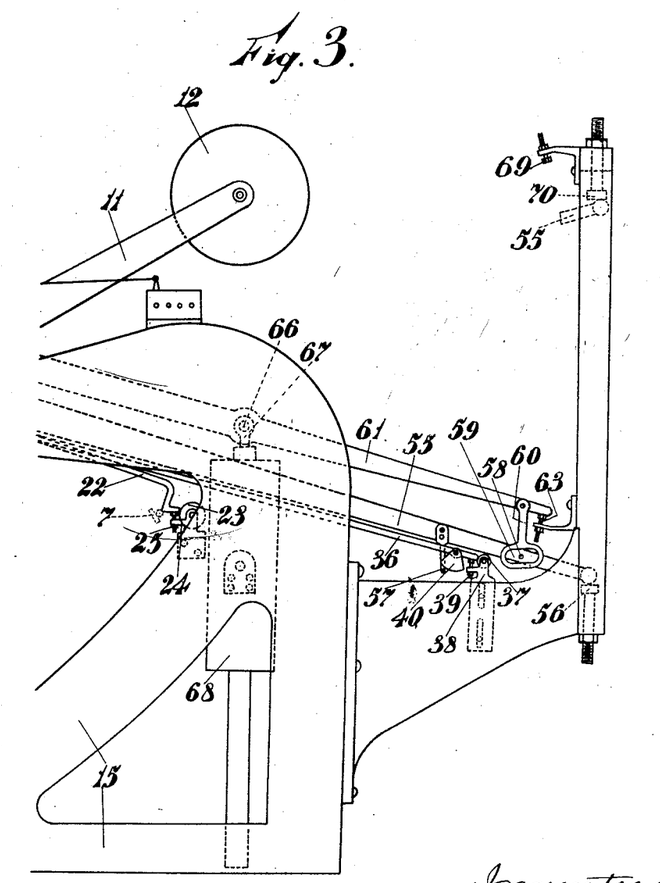

In Fig. 1, 1 represents the weighing receptacle rotatably supported by the shaft 2. This tank or receptacle is suspended by bars 3 from the short arm 4 of an auxiliary beam, the other arm 5 of which is provided with a running weight 6 and a finger 7. This arm 5 is resting (as drawn) against a stud 8 fixed to the bar 3. The auxiliary weighing beam is suspended from one arm of the bellcrank weighing-beam 10 the other arm 11 of which carries a weight 12.

The tank is provided with one or more pins 13 (or similar means) each guided in guides 14 fixed somehow and somewhere at the bottom part of the framework.

A tilting of the bellcrank 10, 11, causes the pin 13 to engage with one of the sides of the guide 14 resulting in a tilting motion of the tank in accordance with a displacement of the bellcrank 10, 11.

Furthermore the tank has two stops 79 and 80, the purpose of which will be explained later on.

The run-out 16 of the receptacle for the matter to be weighed, meets a funnel 17 and is separated therefrom, by means of a large valve 18. A bar 19 is linked to the stem of the valve 18 and is fixed to a shaft 20, the other end of which projects through the wall of the funnel and bears another bar 21 to which is linked another rod 22, the other end of which rests against a roller 23 when the valve is in the "open" position (as drawn) and which is rotatably mounted in a chair 24 which chair is provided with a screw 25 serving as a rest for the rod 22.

Independent of the funnel 17 and joining the runout 16 and situated next to the funnel 17, is a valve chamber 26 provided with a small valve 27. This small valve 27 rests upon the terminal 28 of a toggle lever having its fulcrum at 29, the other arm 30 bearing a counter weight 31. This weight 31 tends to keep the valve closed, but as shown in the drawing, is prevented from actually doing so because a finger 32 of the lever 28, 30 is resting against the pin 33 of a leakage vat 35 which is linked to the funnel 17.

This vat will out of itself, turn underneath the outlet of the funnel and of the valve chamber 26, but will be kept aside by means of a rod 36 linked to it, which rod is resting against a roller 37, mounted upon a fixed chair 38.

The rod 36 is resting on a set screw 39 and is furthermore provided with a rotatable sector 40. A third lever 41, rotatably fixed on the shaft 20 bears a rod 42, the other end of which has a slot 43, engaging a pin 44, belonging to one arm of a lever 45, the other end of which has a pin 46, engaging the slot 47 of a second rod 48, linked with its free end to a point 49 of the leakage vat 35, situated at that side of it which is moved aside. The balance beam 45 is rotatably fixed to a point of the lever 50, linked to a projecting point of the delivery tank and at its other end resting with a roller 51 upon the nose 52 of an arm 53 belonging to the secondary beam 4, 5. Underneath the lever 50 a cam 54 fixed to the outlet of the tank, limits the lower position of said lever 50.

The weighing beam proper or bellcrank 10, 11 has a tail 55, the end of which is resting upon an adjustable stop 56 in the shown position.

To this tail a finger 57 is attached, the end of which engages a sector 40, said tail, moreover, carrying a pin 58 making a loose fit with the slot 59 of an eyebar 60. This eyebar is suspended from a bellcrank lever 61 having its fulcrum at the point 62.

The terminal of this arm of the lever 61 is resting, as is shown in the drawing, near the eyebar 60, upon an adjustable stop 63, whilst the other arm 64 of said bellcrank lever carries a weight 65. At the point 66 the arm 61 of the bellcrank lever is linked to the piston rod 67 of a double buffer device 68.

Adjustable stops 69 and 70 limit the extreme positions, respectively of the bellcrank lever and the tail 55.

The weighing tank is provided with a long and narrow spout 71 and a wider spout 72.

The funnel 17 has a stop-cam 73 for the leakage vat 35.

The operation of the weighing is as follows:

Suppose the apparatus to be in the starting position as shown in the drawing. The valves 18 and 27 are open, the liquid runs into the weighing tank 1. According to the proceeding of the filling the secondary or auxiliary weighing beam 4, 5 will change its position.

This will result in a withdrawal of the nose 52 of the arm 53 from under the roller 51, causing the lever 50 to come to rest upon the cam 54, thereby bringing the pins 44 and 46 of the lever 45 to a lower position, moving down in their respective slots 43, 47.

The valves 18 and 27 thus remain in the "open" position. At the moment that the auxiliary beam has moved so far, that the finger 7 has reached the position indicated in the drawing in dotted lines, it will, on further displacement, lift the bar 22 over the roller 23.

The large valve 18, kept "open" by said bar and the cranks 21 and 19 fixed to the shaft 20, will now meet its seat through its own weight The further filling of the tank is effectuated through the small valve 27.

As soon as the tank will be filled so far that it becomes heavier than the weight 12 of the weighing beam, this latter will at once tumble over to the left.

During the charging operation the tail 55 and the arm 61 of the bellcrank lever are resting against their respective stops 56 and 63 the latter of which is so adjusted so that the pin 58 can move freely in the rest 59 of the connecting rod 60, resulting that at the moment of balance, the arm 61 to which the buffer is connected is free; consequently the buffer device cannot exert any influence upon the sensibility of the apparatus.

If the tail 55 moves upwards the pin 58 will touch the top of the slot 59 and will by means of the rod 60 carry along with it the arm 61 of the toggle beam.

At the same time the tail 55 of the weighing beam will, upon moving upwards, carry along with it by means of finger 57 and sector 40, the bar 36 which was keeping the leakage vat in its extreme lefthand position causing this bar 36 to slip to the right over the roller 37, being under the influence of the weight of the leakage vat 35.

At the beginning of the rotation of the leakage vat the pin 33, secured to it, will release the finger 32 of the lever 28—30 (which was keeping the small valve 37 in the opened position) so that the valve will close under the influence of the weight 31 and after which the leakage vat will shift under the valves.

The buffer 68, joined to the arm 61 by means of a link joint, governs the speed of the motion of said arm and consequently also of the weighing beam 10, 11, until the tail 55 will touch the stop 70 when in its other extreme position (the pouring position of the tank).

After this, the arm 61 will move towards and up to the stop 69, being activated by the weight 65 attached to the other end of the arm 64, of the toggle device, thus causing the release of the pin 58 in the slot 59.

Also in this position the sensibility will not be diminished by the connection with the buffer.

If the bellcrank weighing beam 10, 11 turns from the loading position into the pouring position, the weighing tank 1 will get a tilting motion caused by the pins 13 and the guide 14 and will acquire the position indicated in the drawing in dotted lines.

The buffer has to be adjusted in such a manner that the tilting of the weighing beam and consequently the resulting movement of the weighing tank will be accomplished so slowly that the pins 13 will engage the sides of the guides 14 without any jarring.

The turning motion of the weighing tank should also go so slowly that during this motion there will run out from the spouts 71 and 72 so much liquid that any run over the edge of the charging opening will be prevented.

The tank will empty itself through the spouts 71, 72 so long, until the weight 12 will overbalance the weight of the tank and will cause the weighing beam to tilt to the right, leaving the remainder of the charge, intended to be weighed as tare in the tank.

The careful weighing of this remainder tare weight causes the correct quantity to be delivered by the tank. The weighing beam in so far differs substantially from other weighing beams in that, in order that the weighing tank may deliver one charge, said beam has to do two weighings, an operation carried out in consequence of its special shape and the accurate fixation of the extreme positions.

The buffer being double acting controls the tilting over of the bellcrank lever in the same manner whether it be for the emptying or for the filling position.

The weighing tank is brought home again by means of the pins 13 running between the guides 14.

During the emptying of the weighing tank and before the tilting of the weighing beam, the auxiliary beam 4, 5 has returned in its original position and will be resting against the arm 8, thereby having its arm 53 in the higher position. If the secondary weighing beam turns to the right, the nose 52 of the arm 53 will lift the roller 51, thus moving the lever 50 upwards, causing the bar 48 to shift the leakage vat 35 from under the valves 18 and 27.

The pin 33 attached to the leakage vat 35 will touch the finger 32 of the lever 28, 30 as soon as said vat be wholly removed from the valve, thus causing said lever to turn and the small valve 27 to open.

The large valve 18 being so much heavier, requires a greater force for its lifting than will do for the shifting of the leakage vat, consequently it will not move until the leakage vat will rest against its stop 73 after which the lever 45 will pull the bar 42 and by so doing will move the lever 41 causing the arm 19 to lift the valve 18.

The bars 22 and 36 have now been brought home by the lever 21 and the leakage vat respectively, and are resting against their respective rollers 23 and 37, the machine has returned to the position for being filled.

Figure 4:
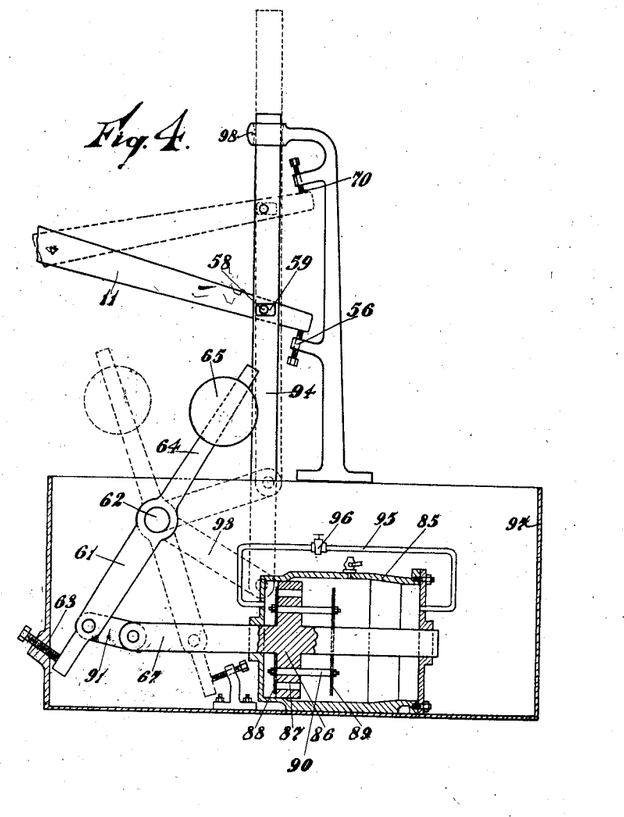
Figs. 4, 5, 6, 7, 8, and 9 are different embodiments of the invention.

In the realization according to Fig. 4 the buffer consists of a cylinder 85 and a piston 86 provided with apertures 87. In part of these latter valves 88—89 are arranged, said valves being connected by means of bars 90.

These valves shut, as soon as the piston has travelled a short distance in one or the other direction, the apertures 87 successively, after which the piston will, upon travelling further, meet resistance from the liquid.

The speed of motion of the piston will now, for its further travel, be dependent upon the free space arranged alongside for the passage of the liquid and changing in width.

The decrease in speed of the piston at the end of the stroke will be obtained according to the invention by means of a decrease in section of the passage from the centre to the extremities of the cylinder.

The piston rod 67 is, outside the cylinder, hinged by means of a connecting rod 91 to one arm 61 of a double armed lever, the other arm of which carries a weight 65.

The shaft 62 of this lever carries a second lever 93, connected to a vertical bar 94.

This bar 94 is guided at its top part in a horizontal eye 98. Furthermore the bar 94 is provided with a slot 59 engaging with ample play a pin 58 secured to an arm 11 of the weighing beam. The limiting stops of the weighing beam bear the numerals 56 and 70 respectively as in the example of Figs. 1 and 7.

The extreme position of the piston are limited by stops 63 and 69.

The cylinder ends are interconnected by a tube having a cock 96 controlling the flow of liquid from one end of the cylinder to the other.

The whole buffer is placed in a tank 97 which may be filled with a liquid, thus preventing any entrance of air.

Figure 5:
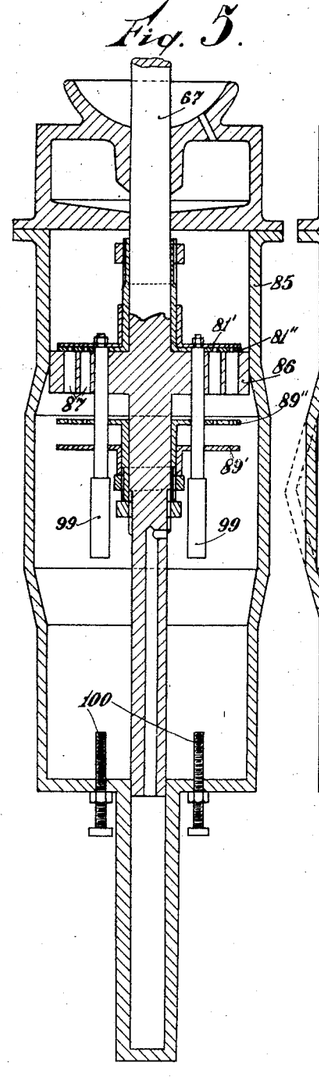
Figure 6:
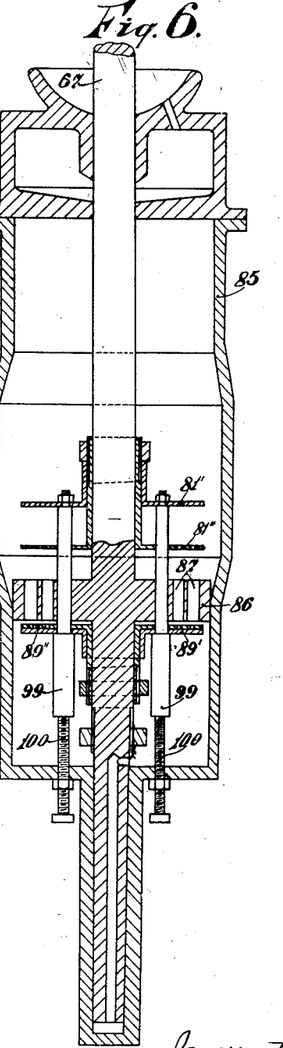

In Figs. 5–6 a vertical buffer is drawn in two extreme positions of the piston.

In these examples the piston has two valves at each side, that one which is nearest the piston $81^2$ or $89^2$ first shuts the apertures 87 in the piston partly whilst the other one $81^1$ and $89^1$ further closes the apertures made in the first valve and by so doing shuts the apertures in the piston wholly.

The valves at the bottom part of the piston will, when the piston is in its highest position, by their own weight open as far as they can and by so being positioned will be just in the right position to cushion the downward motion of the piston. When the piston is in its lowest position then the valves at its top side will have to be kept open and to this purpose rods 99 and set screws 100 have been arranged.

Figure 7:
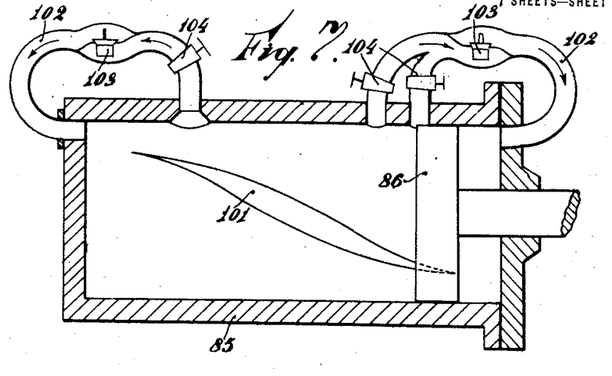

In Fig. 7 a horizontal buffer is drawn, showing a groove 101 for the passage of the liquid alongside the piston.

In this example, instead of the ducts in the piston and the valves, the piston has been provided with tubes 102 and valves 103 with cocks 104 so as to control the speed of flow.

These tubes and valves are situated in such a manner that, for both directions, during the first part of the piston stroke the spaces at both sides of the piston are in communication with each other.

Figure 8:
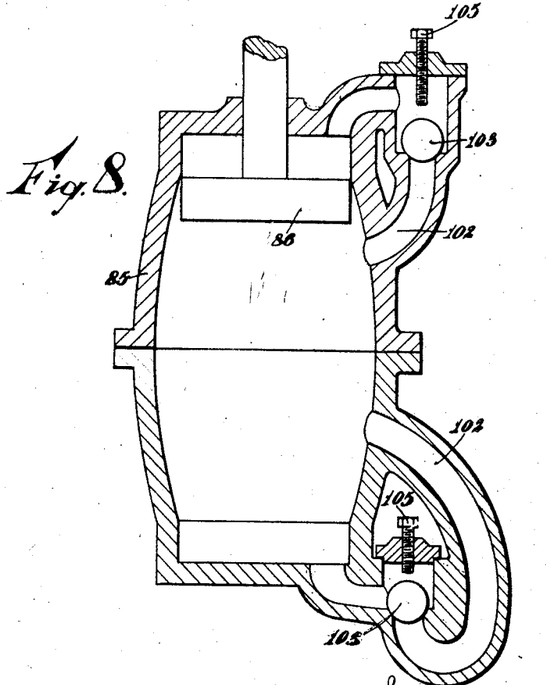

In the example of Fig. 8 relating to a vertical buffer the return valves 103 have been arranged in ducts 102 provided in the cylinder wall. The valves in this case are ball-valves, the lift of which can be regulated by means of set screws 105.

Figure 9:
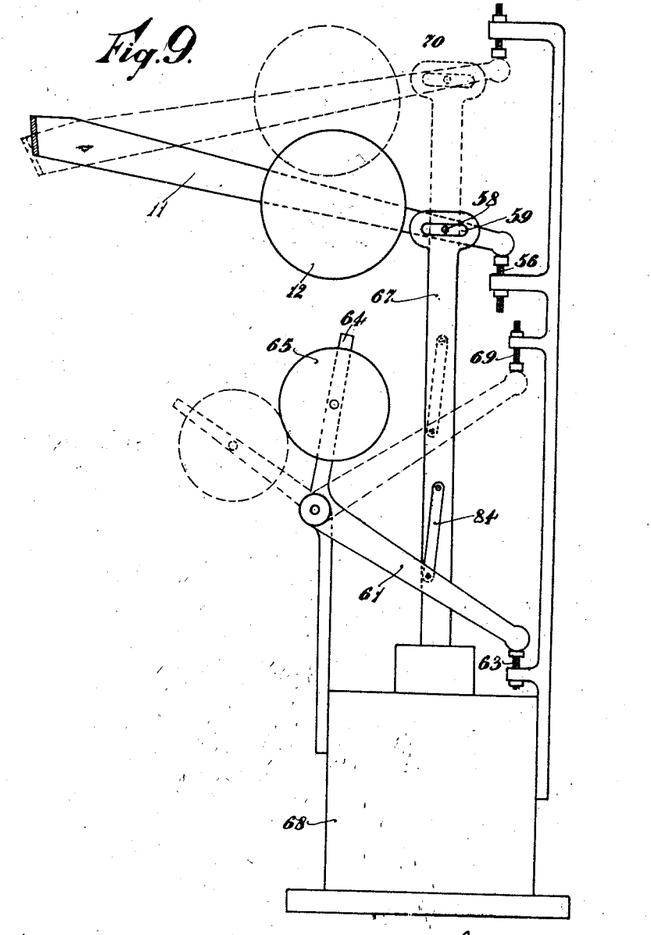

In Fig. 9 a vertical buffer is shown having another exemplification of the device to release the buffer at the moment of balance of the weighing beam. The numerals in this figure are the same as those in Fig. 4 and those in Fig. 1 of the weighing machine.

In the device according to Fig. 9 the groove 59 containing the pin 58 of the weighing beam, has been arranged in the piston rod of the buffer.

The functions of the groove 59, pin 58 and weight 65 are the same as in the weighing machine according to Figs. 1 and 4.

The connection of the buffer piston rod 67 with the arm 61 of the bellcrank lever is made through a connecting rod 84.

That which I claim as my invention, and desire to secure by Letters Patent, is—

1. In a weighing apparatus, the combination with a weighing beam having a weight mass, of a buffer for cushioning the movements of the weighing beam in opposite directions including a piston, a cylinder for said piston having its inner surface of such shape that in the different positions of the piston, from the center to the ends of the travel, the passage for the running of the liquid alongside the piston decreases in section, ducts provided in said piston, and valves for controlling said ducts in such manner that for the movement in both directions of the piston the liquid runs through said ducts from the smaller towards the larger chamber of the cylinder during the first part of the stroke.

2. In a weighing apparatus, the combination with a weighing beam having a weight mass, of a buffer for cushioning the movements of the weighing beam in opposite directions including a piston, a cylinder for said piston having its inner surface of such shape that in the different positions of the piston, from the center to the ends of the travel, the passage for the running of the liquid alongside the piston decreases in section, ducts provided in said piston, valves for controlling said ducts in such manner that for the movement in both directions of the piston the liquid runs through said ducts from the smaller towards the larger chamber of the cylinder during the first part of the stroke, and a tank filled with liquid in which the buffer cylinder is submerged for preventing air from reaching said cylinder.

3. In a weighing apparatus, the combination with a weighing beam having a weight mass, of a buffer for cushioning the movements of the weighing beam in opposite directions including a cylinder containing a cushioning fluid, an apertured piston movably mounted in the cylinder, and disk valves slidably mounted on said piston for controlling the movement of the fluid through the apertures of the piston.

4. In a weighing apparatus, the combination with a weighing beam having a weight mass, of a buffer for cushioning the movements of the weighing beam in opposite directions including a cylinder having a large central portion and reduced end portions, the central portion gradually merging into the end portions, a piston mounted in said cylinder and provided with apertures, and disk valves slidably mounted on said piston and adapted to close the apertures in the piston.

5. In a weighing apparatus, a weighing beam, a pivotally mounted toggle lever whose center of gravity shifts over its fulcrum, means connecting said weighing beam to said toggle lever and capable of permitting the toggle lever to continue to move after the weighing beam has come to rest, a buffer connected to said toggle lever and including a cylinder member having a large central portion and reduced end portions, the central portion gradually merging into the end portions, a piston member mounted in said cylinder member, one of said members being provided with apertures, and valves for controlling said apertures whereby during the movement of the piston in both directions liquid in the cylinder member runs from the smaller toward the larger portion of the cylinder during the first part of the stroke, said toggle lever being adapted to move the buffer piston member after the weighing beam has come to rest.

6. In a weighing apparatus, a weighing beam, a pivotally mounted toggle lever operatively connected with said weighing beam and capable of moving slightly independently of the weighing beam, means for moving the toggle lever in one direction after movement of the toggle lever has been started by the weighing beam, and a buffer connected to said toggle lever and adapted to permit the same to move slightly relatively to the weighing beam after the weighing beam has come to rest.

In testimony whereof I affix my signature.

BALTUS BOULOGNE.